(12) United States Patent
Ryan et al.

(10) Patent No.: US 12,372,638 B2
(45) Date of Patent: Jul. 29, 2025

(54) RADAR AUTHENTICATION METHOD AND APPARATUS, AND COMPUTER STORAGE MEDIUM

(71) Applicant: SHENZHEN YINWANG INTELLIGENT TECHNOLOGIES CO., LTD., Shenzhen (CN)

(72) Inventors: Mark Ryan, Birmingham (GB); Flavio Garcia, Birmingham (GB); Steven Yin Zhong, Singapore (SG); Zhuo Wei, Singapore (SG)

(73) Assignee: SHENZHEN YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 247 days.

(21) Appl. No.: 17/872,066

(22) Filed: Jul. 25, 2022

(65) Prior Publication Data
US 2022/0365195 A1    Nov. 17, 2022

Related U.S. Application Data

(63) Continuation of application No. PCT/CN2020/128640, filed on Nov. 13, 2020.

(51) Int. Cl.
*G01S 13/50* (2006.01)
*G01S 13/02* (2006.01)
*G06F 21/44* (2013.01)

(52) U.S. Cl.
CPC ............ *G01S 13/505* (2013.01); *G06F 21/44* (2013.01); *G01S 2013/0236* (2013.01)

(58) Field of Classification Search
CPC .................................. G06F 21/44; G01S 7/38
See application file for complete search history.

(56) References Cited

U.S. PATENT DOCUMENTS

| 10,705,185 | B1 | 7/2020 | Lien et al. |
| 11,392,685 | B2* | 7/2022 | Peng ................ H04L 63/0869 |
| 2007/0279252 | A1 | 12/2007 | Hellwig |

(Continued)

FOREIGN PATENT DOCUMENTS

| CN | 108256488 A | 7/2018 |
| CN | 108318868 A | 7/2018 |

(Continued)

OTHER PUBLICATIONS

Chen Tao et al.,"Radar emitter recognition based on signal fingerprint feature", Applied Science and Technology, vol. 43, No. 3, Jun. 2016,with an English abstract, total 5 pages.

*Primary Examiner* — Vladimir Magloire
*Assistant Examiner* — Eric K Hodac
(74) *Attorney, Agent, or Firm* — Conley Rose, P.C.

(57) ABSTRACT

A radar authentication method includes after obtaining output data of a to-be-authenticated radar, a computer device that first invokes a prediction model to obtain predicted data of the to-be-authenticated radar based on the output data of the to-be-authenticated radar, where the prediction model is obtained through training based on output data of a target radar. Then the computer device verifies, based on the predicted data of the to-be-authenticated radar and the output data of the to-be-authenticated radar, whether the to-be-authenticated radar and the target radar are the same radar.

20 Claims, 2 Drawing Sheets

(56) References Cited

U.S. PATENT DOCUMENTS

| | | |
|---|---|---|
| 2019/0361113 A1 | 11/2019 | Ray |
| 2019/0383900 A1 | 12/2019 | Bialer et al. |
| 2020/0049797 A1 | 2/2020 | Sugawara |
| 2020/0090322 A1* | 3/2020 | Seo .................... G06N 3/084 |
| 2021/0398097 A1* | 12/2021 | Wu .................... G06V 20/40 |
| 2022/0138332 A1* | 5/2022 | Westmeyer ............. G01S 7/493 |
| | | 726/26 |

FOREIGN PATENT DOCUMENTS

| | | | |
|---|---|---|---|
| CN | 109937369 A | 6/2019 | |
| CN | 110535481 A | 12/2019 | |
| CN | 110736983 A | 1/2020 | |
| CN | 111427031 A | 7/2020 | |
| DE | 102008000571 A1 | 9/2009 | |
| DE | 102012024880 A1 * | 6/2014 | .......... G01S 15/876 |
| EP | 3136123 A1 | 3/2017 | |
| JP | 2020180875 A | 11/2020 | |
| KR | 20200013479 A * | 2/2020 | .............. G01S 7/02 |

* cited by examiner

RADAR AUTHENTICATION METHOD AND APPARATUS, AND COMPUTER STORAGE MEDIUM

CROSS-REFERENCE TO RELATED APPLICATIONS

This application is a continuation of International Patent Application No. PCT/CN2020/128640 filed on Nov. 13, 2020, which is hereby incorporated by reference in its entirety.

TECHNICAL FIELD

This application relates to the field of radar technologies, and in particular, to a radar authentication method and apparatus, and a computer storage medium.

BACKGROUND

Self-driving vehicles have gained more attention because they are capable of implementing unmanned driving. A radar and an in-vehicle terminal are deployed on a self-driving vehicle. The self-driving vehicle senses an ambient environment by using the radar, and performs environment analysis and travel path planning by using the in-vehicle terminal based on data returned by the radar. To avoid an attack on the in-vehicle terminal after an unauthorized change of the radar in a use process, the in-vehicle terminal needs to periodically authenticate an identity of the radar communicating with the in-vehicle terminal, that is, verify whether the radar communicating with the in-vehicle terminal is an original legal radar.

A radar authentication method based on a digital certificate and a digital signature is usually used. A root certificate is preset in the in-vehicle terminal, and a device certificate (including a certificate public key) of the radar that is issued based on the root certificate and a private key corresponding to the certificate public key are preset in the original legal radar. After the legal radar is mounted, the legal radar sends the device certificate of the legal radar to the in-vehicle terminal, and the in-vehicle terminal uses the root certificate to decrypt the device certificate of the legal radar, to obtain the certificate public key in the device certificate. When the in-vehicle terminal needs to authenticate the identity of the radar communicating with the in-vehicle terminal, the in-vehicle terminal may send a random number to the radar. The radar encrypts the random number by using the private key corresponding to the certificate public key of the radar, to obtain a signature (that is, a ciphertext) of the random number, and sends the signature to the in-vehicle terminal. The in-vehicle terminal decrypts the signature by using the certificate public key of the legal radar. If the decryption can be successful, and the decrypted random number is the same as the random number sent by the in-vehicle terminal to the radar, it indicates that the radar is the original legal radar, otherwise, the radar is not the original legal radar.

However, before the radar authentication method is used, the device certificate and the private key corresponding to the certificate public key need to be preset in the radar. Information storage security of most radars is relatively low, and keys are prone to leakage. Therefore, reliability of radar identity authentication is currently relatively low.

SUMMARY

This application provides a radar authentication method and apparatus, and a computer storage medium, to resolve a problem that reliability of radar identity authentication is currently relatively low.

According to a first aspect, a radar authentication method is provided. The method includes the following steps. A computer device obtains output data of a to-be-authenticated radar. The computer device invokes a prediction model to obtain predicted data of the to-be-authenticated radar based on the output data of the to-be-authenticated radar, where the prediction model is obtained through training based on output data of a target radar, and the output data of the target radar is obtained based on an emitted wave of the target radar and a reflected wave received by the target radar. The computer device verifies, based on the predicted data of the to-be-authenticated radar and the output data of the to-be-authenticated radar, whether the to-be-authenticated radar and the target radar are the same radar, where the output data of the to-be-authenticated radar is received by the computer device from the to-be-authenticated radar.

In this application, there is no need to preset a key in the radar, and the computer device can authenticate an identity of the to-be-authenticated radar based on the output data of the to-be-authenticated radar and the prediction model that is obtained through training based on the output data of the target radar. Therefore, a security problem in radar authentication is fundamentally resolved, and reliability of radar authentication is relatively high.

Optionally, the prediction model is obtained by the computer device through training, or the prediction model comes from a device other than the computer device, that is, the computer device receives the prediction model from another device.

Optionally, the output data of the target radar includes real data of a plurality of channels of the target radar. The prediction model includes at least one sub-model, and each sub-model corresponds to one of the plurality of channels. A target sub-model corresponding to a target channel in the plurality of channels of the target radar is obtained through training based on real data of other channels of the target radar and real data of the target channel of the target radar, and the other channels of the target radar include at least one of the plurality of channels of the target radar other than the target channel.

The other channels of the target radar may include all of the plurality of channels of the target radar except the target channel. The target channel may be any channel of the target radar, and the computer device may obtain a sub-model corresponding to one or more channels of the target radar through training.

Optionally, the target sub-model is obtained through training based on the real data of the other channels of the target radar and the real data of the target channel of the target radar by using a linear regression algorithm. Certainly, the sub-model corresponding to the channel of the target radar may alternatively be obtained through training by using another machine learning algorithm. This is not limited in this application.

Optionally, the target sub-model is obtained through training by using a linear regression model, and the linear regression model is expressed as follows:

$$y_{k,i} = \sum_{1 \le j \le n} c_{k,j} x_{i,j} + b_k,$$

where k represents the target channel, $y_{k,i}$ represents real data i of the target channel k of the target radar, n represents a quantity of the other channels, j represents a channel j among the other channels, $c_{k,j}$ represents a coefficient j of the target sub-model, $x_{i,j}$ represents real data i of the channel j of the target radar, $b_k$ represents an increment of the target sub-model, and k, i, j, and n are all positive integers.

Optionally, an implementation process in which the computer device invokes the prediction model to obtain the predicted data of the to-be-authenticated radar based on the output data of the to-be-authenticated radar includes that the computer device invokes the target sub-model to obtain predicted data of a target channel of the to-be-authenticated radar based on real data of other channels of the to-be-authenticated radar. Correspondingly, an implementation process in which the computer device verifies, based on the predicted data of the to-be-authenticated radar and the output data of the to-be-authenticated radar, whether the to-be-authenticated radar and the target radar are the same radar includes that the computer device verifies, based on the predicted data of the target channel of the to-be-authenticated radar and real data of the target channel of the to-be-authenticated radar, whether the to-be-authenticated radar and the target radar are the same radar.

In this application, after receiving the output data of the to-be-authenticated radar, the computer device analyzes the output data of the to-be-authenticated radar based on a predetermined mode. However, in essence, the output data of the to-be-authenticated radar is not necessarily data obtained by the to-be-authenticated radar based on an emitted wave of the to-be-authenticated radar and a reflected wave received by the to-be-authenticated radar, that is, the data analyzed by the computer device may be fake radar data. Real data of a plurality of channels of the to-be-authenticated radar described in this application comes from the output data of the to-be-authenticated radar, and the real data is not limited to data obtained based on the emitted wave of the to-be-authenticated radar and the reflected wave received by the to-be-authenticated radar.

Optionally, an implementation process in which the computer device verifies, based on the predicted data of the target channel of the to-be-authenticated radar and the real data of the target channel of the to-be-authenticated radar, whether the to-be-authenticated radar and the target radar are the same radar includes, when a cosine similarity between the predicted data of the target channel of the to-be-authenticated radar and the real data of the target channel of the to-be-authenticated radar is less than a first threshold, and a mean square error (MSE) between the predicted data of the target channel of the to-be-authenticated radar and the real data of the target channel of the to-be-authenticated radar is greater than a second threshold, and/or a fraction of variance unexplained (FVU) that is obtained through calculation based on the predicted data of the target channel of the to-be-authenticated radar and the real data of the target channel of the to-be-authenticated radar is greater than a third threshold, the computer device determines that the to-be-authenticated radar and the target radar are not the same radar.

Optionally, an implementation process in which the computer device verifies, based on the predicted data of the target channel of the to-be-authenticated radar and the real data of the target channel of the to-be-authenticated radar, whether the to-be-authenticated radar and the target radar are the same radar includes that the computer device verifies, based on predicted data of a plurality of target channels of the to-be-authenticated radar and real data of the plurality of target channels of the to-be-authenticated radar, whether the to-be-authenticated radar and the target radar are the same radar.

Optionally, the target radar is a millimeter wave radar, and the output data of the target radar includes a Doppler frequency.

According to a second aspect, a computer device is provided. The computer device includes a plurality of functional modules. The plurality of functional modules interacts with each other to implement the method in the first aspect or the implementations of the first aspect. The plurality of functional modules may be implemented based on software, hardware, or a combination of software and hardware, and the plurality of functional modules may be randomly combined or divided based on an example implementation.

According to a third aspect, a computer device is provided, including a processor and a memory.

The memory is configured to store a computer program, and the computer program includes program instructions.

The processor is configured to invoke the computer program to implement the method in the first aspect or each implementation of the first aspect.

According to a fourth aspect, a computer storage medium is provided. The computer storage medium stores instructions, and when the instructions are executed by a processor of a computer device, the method in the first aspect or each implementation of the first aspect is implemented.

According to a fifth aspect, a chip is provided. The chip includes a programmable logic circuit and/or program instructions, and when the chip runs, the method in the first aspect or each implementation of the first aspect is implemented.

The technical solutions provided in this application include at least the following beneficial effects.

In this application, after obtaining the output data of the to-be-authenticated radar, the computer device invokes the prediction model obtained through training based on the real data of the plurality of channels of the target radar, to obtain the predicted data of the to-be-authenticated radar based on the output data of the to-be-authenticated radar, and then authenticates the to-be-authenticated radar based on the predicted data of the to-be-authenticated radar and the real data of the to-be-authenticated radar. There is no need to preset a key in the radar, and the identity of the to-be-authenticated radar can be authenticated only based on the output data of the to-be-authenticated radar and the prediction model that is obtained through training based on the output data of the target radar. Therefore, a security problem in radar authentication is fundamentally resolved, and reliability of radar authentication is relatively high.

DESCRIPTION OF EMBODIMENTS

Figure 1:
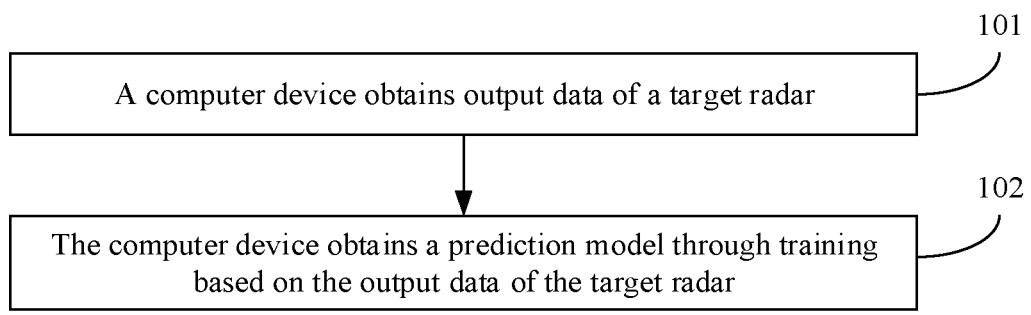
FIG. 1 is a schematic flowchart of a model training method according to an embodiment of this application.

To make the objectives, technical solutions, and advantages of this application clearer, the following further describes embodiments of this application in detail with reference to the accompanying drawings.

A radar is an electronic device that uses an electromagnetic wave to detect a target. The radar obtains, by emitting an electromagnetic wave to irradiate the target and receiving an echo of the target, information such as a distance from the target to an electromagnetic wave emission point, a distance change rate (radial velocity), an azimuth, and a height. The radar generally includes a transmitter, an antenna, a receiver, and a processor. The transmitter generates an electromagnetic wave and emits the electromagnetic wave to a direction in space by using the antenna, a target in the direction reflects the encountered electromagnetic wave, and the receiver receives, by using the antenna, the electromagnetic wave reflected by the target. The electromagnetic wave generated and emitted by the transmitter may be referred to as an emitted wave. The electromagnetic wave reflected by the target may be referred to as a reflected wave (or an echo). The processor processes the emitted wave and the reflected wave to obtain related information of the target.

A principle of measuring a distance is to measure a time difference between an emitted pulse and an echo pulse. Because the electromagnetic wave propagates at a speed of light, an accurate distance from the target to the radar can be obtained through calculation based on the time difference between the emitted pulse and the echo pulse and the speed of light.

A principle of measuring an azimuth of the target is to obtain a height of the target based on an elevation and a distance from the target to the radar by using a sharp azimuth beam of the antenna and measuring an elevation beam of a narrow elevation.

A principle of measuring a velocity is a frequency Doppler effect produced during relative motion between the radar and the target. A frequency of the reflected wave received by the radar is different from a frequency of the emitted wave of the radar, and a difference between the two frequencies is referred to as a Doppler frequency. Based on the Doppler frequency, a change rate of the distance between the radar and the target can be obtained through calculation. When the target and an interference spurious wave exist in a same spatial resolution unit of the radar, the radar can detect and track the target from the interference spurious wave by using a difference between the Doppler frequency and a frequency of the interference spurious wave.

According to operating bands, current radars may be classified into an ultrasonic radar, a millimeter wave radar, a laser radar, and the like. The ultrasonic radar operates in an ultrasonic band, and its operating band is approximately 20 kilohertz (kHz) to 40 kHz. An operating band of the millimeter wave radar is approximately 10 gigahertz (GHz) to 200 GHz. The laser radar operates in infrared and visible light bands. The radar generally includes a plurality of channels in the operating band, and each channel corresponds to a specific transmit frequency.

The radar may send data obtained through processing based on the emitted wave and the received reflected wave to a computer device connected to the radar. In the embodiments of this application, the data sent by the radar to the computer device connected to the radar is referred to as output data of the radar. The output data of the radar is obtained based on the emitted wave of the radar and the reflected wave received by the radar. After receiving the output data of the radar, the computer device obtains the distance from the target to the radar, the height of the target, and/or the change rate of the distance between the target and the radar, and the like through calculation based on the output data, to position the target.

For example, in the self-driving field, a self-driving vehicle may sense an ambient environment by using a radar. The radar sends, to an in-vehicle terminal, output data obtained by processing an emitted wave of the radar and a reflected wave received by the radar. The in-vehicle terminal obtains related information of the target such as a distance from the target to the radar, a height of the target, and/or a change rate of a distance between the target and the radar through calculation based on the output data of the radar, and then performs environment analysis and travel path planning for the self-driving vehicle based on a calculation result.

The following embodiments of this application are all described by using a millimeter wave radar as an example. Output data of the millimeter wave radar may be a difference between a frequency of a received reflected wave and a frequency of an emitted wave of the millimeter wave radar (that is, a Doppler frequency of the millimeter wave radar). The millimeter wave radar generally has 16 channels or 12 channels. For example, the output data of the millimeter wave radar having 16 channels may be expressed as follows:

| 18.12 | 27.93 | −2.75 | −8.56 | 30    | 8.18 | 14.12 | −7.12 | 0.81  | −12.43 | 40.56 | 29.12 | 6.62 | −34.43 | 33.68 | 34.56 |
| 18.25 | 29.06 | −2.37 | −8    | 30.37 | 9.12 | 14.25 | −7.37 | 0.93  | −11.37 | 41.12 | 29.18 | 6.5  | −34.37 | 32.68 | 34.18 |
| 17.87 | 28.43 | −3.12 | −8.81 | 30.56 | 8.62 | 13.93 | −7.18 | 0.81  | −11.93 | 41.06 | 28.43 | 6.25 | −34.87 | 32.68 | 34.12 |
| 18.5  | 28.56 | −2.5  | −8.56 | 30.25 | 8.93 | 14.5  | −6.81 | −0.06 | −10.87 | 41.25 | 29.18 | 6.62 | −34.62 | 33.37 | 33.68 |
| ...   | ...   | ...   | ...   | ...   | ...  | ...   | ...   | ...   | ...    | ...   | ...   | ...  | ...    | ...   | ..., | where a row of data indicates Doppler frequencies of the 16 channels of the radar at a same moment, and a column of data indicates Doppler frequencies of one channel of the radar at different moments.

If the radar is maliciously changed in a use process, the radar may attack the computer device, and security of the computer device cannot be ensured. To avoid an attack on the computer device after an unauthorized change of the radar in the use process, the computer device may periodically authenticate an identity of the radar communicating with the computer device, that is, verify whether the radar communicating with the computer device is an original legal radar. However, when the computer device authenticates the identity of the radar by using a method based on a digital certificate and a digital signature, a device certificate and a private key corresponding to a public key of the device certificate need to be preset in the radar. Currently, information storage security of most radars is relatively low, and keys are prone to leakage. Therefore, reliability of radar identity authentication is currently relatively low.

In the embodiments of this application, after the computer device establishes a communication connection to the mounted legal radar, after receiving the output data of the legal radar, the computer device extracts a fingerprint of the legal radar based on characteristics of the emitted wave of the legal radar itself and the received reflected wave. In a subsequent communication process between the computer device and the radar, after receiving the output data of the communication radar, the computer device authenticates the identity of the communication radar based on characteristics of the emitted wave of the communication radar and the received reflected wave and based on the fingerprint of the legal radar. An implementation process may include that the computer device obtains the output data of the legal radar, and obtains a prediction model through training based on the output data of the legal radar, where a model parameter of the prediction model may be considered as the fingerprint of the legal radar. After the computer device obtains the output data of the communication radar, the computer device invokes the prediction model to obtain predicted data of the communication radar based on the output data of the communication radar, and then verifies, based on the predicted data of the communication radar and the output data of the communication radar, whether the communication radar and the legal radar are the same radar. In the following embodiments of this application, the original legal radar is referred to as a target radar, and the radar that the computer device needs to authenticate is referred to as a to-be-authenticated radar.

In the embodiments of this application, there is no need to preset a key in the radar, and an identity of the to-be-authenticated radar can be authenticated based on the output data of the target radar and the output data of the to-be-authenticated radar. Therefore, a security problem in radar authentication is fundamentally resolved, and reliability of radar authentication is relatively high.

The following embodiments of this application are divided into two parts to describe the solutions in detail. The first part describes a process of obtaining a prediction model through training based on output data of a target radar with reference to FIG. 1. The second part describes a process of invoking the prediction model to authenticate a to-be-authenticated radar based on output data of the to-be-authenticated radar with reference to FIG. 2. A computer device configured to obtain the prediction model through training based on the output data of the target radar and a computer device configured to invoke the prediction model to authenticate the to-be-authenticated radar based on the output data of the to-be-authenticated radar may be the same computer device, may be different computer devices.

FIG. 1 is a schematic flowchart of a model training method according to an embodiment of this application. As shown in FIG. 1, the method includes the following steps.

Step 101: A computer device obtains output data of a target radar.

The output data of the target radar is obtained based on an emitted wave of the target radar and a reflected wave received by the target radar. Optionally, the output data of the target radar includes real data of a plurality of channels of the target radar. When the target radar is a millimeter wave radar, the output data of the target radar includes Doppler frequencies of the plurality of channels of the target radar. The output data of the target radar generally includes a plurality of groups of real data of the plurality of channels of the target radar, and each group of real data includes real data of a plurality of channels of the target radar at a moment.

Optionally, the plurality of channels of the target radar may include all channels of the target radar.

Step 102: The computer device obtains a prediction model through training based on the output data of the target radar.

Optionally, the prediction model includes at least one sub-model, and each sub-model corresponds to one of the plurality of channels of the target radar. A target sub-model corresponding to a target channel in the plurality of channels may be obtained through training based on real data of other channels of the target radar and real data of the target channel of the target radar. The other channels of the target radar may include at least one of the plurality of channels of the target radar other than the target channel.

Optionally, the target sub-model corresponding to the target channel is obtained through training based on the real data of the other channels of the target radar and the real data of the target channel of the target radar by using a linear regression algorithm. The target sub-model corresponding to the target channel is obtained through training by using a linear regression model. The linear regression model is expressed as follows:

$$y_{k,i} = \sum_{1 \le j \le n} c_{k,j} x_{i,j} + b_k, \qquad \text{(formula 1)}$$

where k represents the target channel, $y_{k,i}$ represents real data i of the target channel k of the target radar, n represents a quantity of the other channels, j represents a channel j among the other channels, $c_{k,j}$ represents a coefficient j of the target sub-model, $x_{i,j}$ represents real data i of the channel j of the target radar, $b_k$ represents an increment of the target sub-model, and k, i, j, and n are all positive integers. The real data i of the target channel k of the target radar and the real data i of the channel j of the target radar belong to a same group of real data at a same moment in the output data of the target radar. The computer device may substitute a plurality of groups of real data of the other channels of the target radar and the real data of the target channel of the target radar at a plurality of moments into the foregoing formula 1 to obtain the coefficient $c_{k,j}$ and the increment $b_k$ of the target sub-model through fitting.

It can be learned from the foregoing linear regression model that the target sub-model has one or more coefficients and one increment, and that a quantity of coefficients of the target sub-model and a quantity of other channels used for training the target sub-model are the same and are both n. Optionally, the other channels of the target radar include all of the plurality of channels of the target radar except the target channel. Alternatively, the other channels of the target radar include a specified channel of the plurality of channels of the target radar other than the target channel. For example, the target radar has 16 channels. The computer device may use real data of 15 channels as an input of the linear regression model, and use real data of the remaining one channel as an output of the linear regression model, to train a sub-model corresponding to the remaining one channel. Alternatively, the computer device may use real data of channels 1, 3, 5, and 7 as an input of the linear regression model, and use real data of a channel 2 as an output of the linear regression model, to train a sub-model corresponding to the channel 2.

Optionally, the target channel may be any channel of the target radar. The computer device may obtain a sub-model corresponding to each channel of the target radar through training by using the foregoing implementation process, that is, the prediction model may include a plurality of sub-models, and the plurality of sub-models are in a one-to-one correspondence with the plurality of channels of the target radar. Alternatively, the computer device may obtain sub-models corresponding to a plurality of specified channels of the target radar through training separately by using the foregoing implementation process, for example, obtain only sub-models corresponding to odd channels or even channels through training. In this embodiment of this application, a quantity of sub-models included in the prediction model obtained through training and specific channels corresponding to the included sub-models are not limited.

In this embodiment of this application, the target sub-model obtained by the computer device through training based on the linear regression model may be expressed as follows:

$$\hat{y}_k = \sum_{1 \leq j \leq n} c_{k,j} x_j + b_k, \quad \text{(formula 2)}$$

where $\hat{y}_k$ represents predicted data of a target channel k of a to-be-authenticated radar, $x_j$ represents real data of a channel j of the to-be-authenticated radar, and $c_{k,j}$ and $b_k$ are respectively a coefficient and an increment of the target sub-model obtained through fitting based on the foregoing linear regression model. It can be learned based on the target sub-model corresponding to the target channel that the target sub-model includes n coefficients and one increment. The n coefficients and one increment in the target sub-model are used to form a vector. In this embodiment of this application, the vector may be used as a fingerprint of the target channel. For example, the fingerprint $A_k$ of the target channel k may be expressed as:

$$A_k = [c_{k,1} c_{k,2} \ldots c_{k,n} b_k]. \quad \text{(formula 3)}$$

In this embodiment of this application, a fingerprint of a channel of the target radar may be used as a fingerprint of the target radar, or fingerprints of a plurality of channels of the target radar may be used together as a fingerprint of the target radar. For example, the fingerprint of the target radar includes fingerprints of m channels of the target radar, and a fingerprint of each of the m channels is obtained through training by using real data of the channel and real data of other n channels, where m is a positive integer. In this case, the fingerprint B of the target radar may be expressed as follows:

$$B = \begin{bmatrix} A_1 \\ A_2 \\ \ldots \end{bmatrix} = \begin{bmatrix} c_{1,1} & c_{1,2} & \ldots & c_{1,n} & b_1 \\ c_{2,1} & c_{2,2} & \ldots & c_{2,n} & b_2 \\ \ldots & \ldots & \ldots & \ldots \\ c_{m,1} & c_{m,2} & \ldots & c_{m,n} & b_n \end{bmatrix}. \quad \text{(formula 4)}$$

In this embodiment of this application, for a radar having N channels, a fingerprint of the radar may be expressed by using a matrix p*q, where $1 \leq p \leq N$, and $1 \leq q \leq N$. Each row of data of the matrix is a fingerprint of a channel of the radar.

Optionally, after the sub-model included in the prediction model is obtained through training based on the output data of the target radar, the computer device may directly store the sub-model (that is, the formula 2), or may separately store a fingerprint of the sub-model (that is, the formula 3), or may store the fingerprint of the target radar (that is, the formula 4). When the computer device stores the fingerprint of the sub-model or the fingerprint of the target radar, if the computer device needs to use the sub-model, the computer device may obtain the corresponding sub-model based on the fingerprint of the sub-model or the fingerprint of the target radar in combination with the linear regression model (the formula 1).

Figure 2:
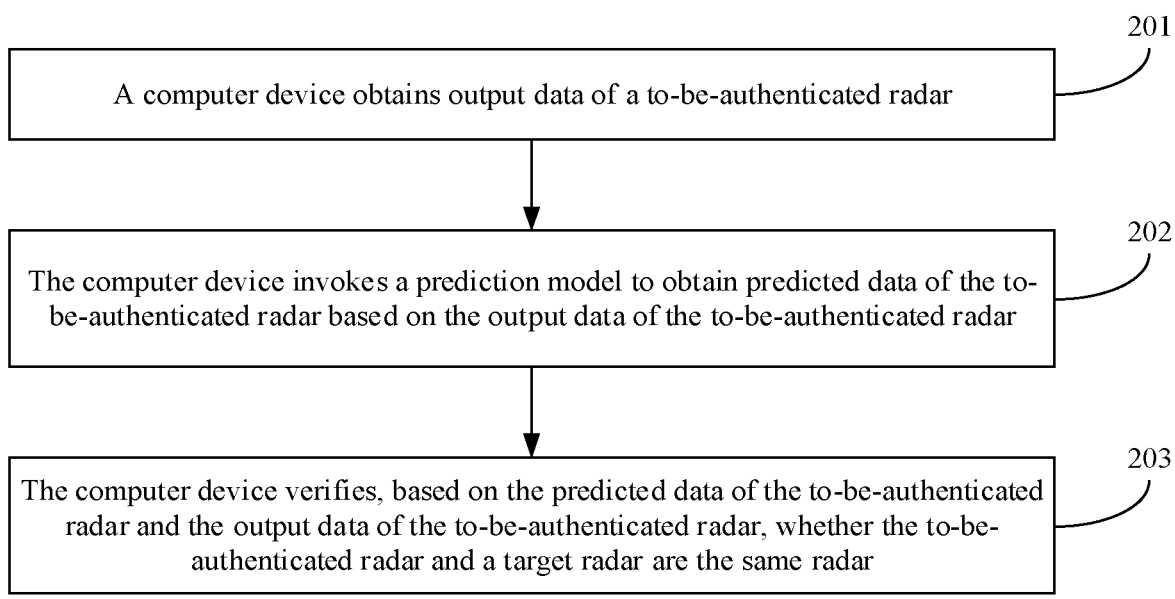
FIG. 2 is a schematic flowchart of a radar authentication method according to an embodiment of this application.

FIG. 2 is a schematic flowchart of a radar authentication method according to an embodiment of this application. As shown in FIG. 2, the method includes the following steps.

Step 201: A computer device obtains output data of a to-be-authenticated radar.

Optionally, the output data of the to-be-authenticated radar includes real data of a plurality of channels of the to-be-authenticated radar. If the to-be-authenticated radar is a legal radar, the output data of the to-be-authenticated radar is obtained based on an emitted wave of the to-be-authenticated radar and a reflected wave received by the to-be-authenticated radar. In this embodiment of this application, the output data of the to-be-authenticated radar is not necessarily the data obtained by the to-be-authenticated radar based on the emitted wave of the to-be-authenticated radar and the reflected wave received by the to-be-authenticated radar. The output data of the to-be-authenticated radar may also be fake radar data. The real data of the plurality of channels of the to-be-authenticated radar described in this embodiment of this application comes from the output data of the to-be-authenticated radar, and the real data is not limited to data obtained based on the emitted wave of the to-be-authenticated radar and the received reflected wave.

Optionally, when the to-be-authenticated radar is a millimeter wave radar, the output data of the to-be-authenticated radar includes Doppler frequencies of the plurality of channels of the to-be-authenticated radar. The output data of the to-be-authenticated radar generally includes a plurality of groups of real data of the plurality of channels of the to-be-authenticated radar, and each group of real data includes real data of a plurality of channels of the to-be-authenticated radar at a moment.

Optionally, the plurality of channels of the to-be-authenticated radar include all channels of the to-be-authenticated radar. After obtaining the output data of the to-be-authenticated radar, the computer device may first compare a quantity of channels of the to-be-authenticated radar and a quantity of channels of a target radar, and after determining that the quantity of the channels of the to-be-authenticated radar and the quantity of the channels of the target radar are equal, perform step 202. If the quantity of the channels of the to-be-authenticated radar and the quantity of the channels of the target radar are not equal, the computer device may directly determine that the to-be-authenticated radar and the target radar are not the same radar, and end the authentication process of the to-be-authenticated radar.

Step 202: The computer device invokes a prediction model to obtain predicted data of the to-be-authenticated radar based on the output data of the to-be-authenticated radar.

Optionally, the prediction model is obtained by the computer device through training, or the prediction model comes from a device other than the computer device, that is, the computer device receives the prediction model from another device. For a process of training the prediction model by the computer device, refer to related content of the foregoing model training method. Details are not described herein again in this embodiment of this application.

Optionally, the prediction model includes at least one sub-model, and each sub-model corresponds to one channel. In this embodiment of this application, an example in which the prediction model includes a target sub-model corresponding to a target channel is used to describe the process of invoking the prediction model to obtain the predicted data of the to-be-authenticated radar. The process further includes that the computer device invokes the target sub-model corresponding to the target channel to obtain the predicted data of the target channel of the to-be-authenticated radar based on real data of other channels of the to-be-authenticated radar. The other channels of the to-be-authenticated radar include at least one of the plurality of channels of the to-be-authenticated radar other than the target channel. Optionally, the other channels of the to-beauthenticated radar may include all of the plurality of channels of the to-be-authenticated radar except the target channel. In this embodiment of this application, the real data is used to predict the data of the target channel, and the other channels are the same as other channels used for training the target sub-model. For example, during training of a sub-model corresponding to a channel 2, real data of channels 1, 2, 3, 5, and 7 of the target radar is used. Real data of the channels 1, 3, 5, and 7 is used as an input of a linear regression model, and real data of the channel 2 is used as an output of the linear regression model. In this case, when the sub-model corresponding to the channel 2 is invoked to obtain predicted data of the channel 2 of the to-be-authenticated radar, the real data of the channels 1, 3, 5, and 7 of the to-be-authenticated radar should also be used as an input of the sub-model corresponding to the channel 2, and an output of the sub-model corresponding to the channel 2 is used as the predicted data of the channel 2 of the to-be-authenticated radar.

The computer device invokes the target sub-model corresponding to the target channel to obtain the predicted data of the target channel of the to-be-authenticated radar based on real data of other channels of the to-be-authenticated radar. One implementation may be inputting the real data of the other channels of the to-be-authenticated radar into the target sub-model, to obtain the predicted data of the target channel of the to-be-authenticated radar that is output by the target sub-model. In other words, the real data $x_1$ of the other channels of the to-be-authenticated radar may be substituted into the foregoing formula (2), to obtain the predicted data $\hat{y}_k$ of the target channel through calculation. When the output data of the to-be-authenticated radar includes a plurality of groups of real data of a plurality of channels, the computer device may input each group of real data of the other channels of the to-be-authenticated radar into the target sub-model separately, to obtain a plurality of pieces of predicted data of the target channel of the to-be-authenticated radar.

In this embodiment of this application, when the prediction mode includes a plurality of sub-models, the computer device may invoke sub-models corresponding to different channels to obtain predicted data of different channels of the to-be-authenticated radar separately. For example, the to-be-authenticated radar has 16 channels, and each channel corresponds to one sub-model. In this case, the prediction model includes 16 sub-models. The computer device invokes each of the 16 sub-models to obtain, based on real data of other 15 channels, predicted data of a channel corresponding to the sub-model, thereby obtaining predicted data of the 16 channels separately. For example, the computer device may invoke a sub-model corresponding to the channel 1 to obtain predicted data of the channel 1 based on real data of the channels 2 to 16, invoke a sub-model corresponding to the channel 2 to obtain predicted data of the channel 2 based on real data of the channels 1 and 3 to 16, and so on.

Step 203: The computer device verifies, based on the predicted data of the to-be-authenticated radar and the output data of the to-be-authenticated radar, whether the to-be-authenticated radar and the target radar are the same radar.

Optionally, the computer device verifies, based on the predicted data of the target channel of the to-be-authenticated radar and the real data of the target channel of the to-be-authenticated radar, whether the to-be-authenticated radar and the target radar are the same radar.

Optionally, when a cosine similarity between the predicted data of the target channel of the to-be-authenticated radar and the real data of the target channel of the to-be-authenticated radar is less than a first threshold, and an MSE between the predicted data of the target channel of the to-be-authenticated radar and the real data of the target channel of the to-be-authenticated radar is greater than a second threshold, and/or an FVU that is obtained through calculation based on the predicted data of the target channel of the to-be-authenticated radar and the real data of the target channel of the to-be-authenticated radar is greater than a third threshold, the computer device determines that the to-be-authenticated radar and the target radar are not the same radar.

It is assumed that the output data of the to-be-authenticated radar includes z groups of real data of the plurality of channels of the to-be-authenticated radar, where z is a positive integer.

A manner of calculating the cosine similarity $C_k$ between the predicted data of the target channel of the to-be-authenticated radar and the real data of the target channel of the to-be-authenticated radar is as follows:

$$c_k = \frac{\sum_{t=1}^{z}(y_{k,t}) \cdot (\hat{y}_{k,t})}{\sqrt{\sum_{t=1}^{z}y_{k,t}^2 \cdot \sum_{t=1}^{z}\hat{y}_{k,t}^2}}. \quad \text{(formula 5)}$$

A manner of calculating the $MSE_k$ between the predicted data of the target channel of the to-be-authenticated radar and the real data of the target channel of the to-be-authenticated radar is as follows:

$$MSE_k = \frac{1}{z}\sum_{t=1}^{z}(y_{k,t} - \hat{y}_{k,t})^2. \quad \text{(formula 6)}$$

A manner of calculating the $FVU_k$ that is obtained through calculation based on the predicted data of the target channel of the to-be-authenticated radar and the real data of the target channel of the to-be-authenticated radar is as follows:

$$FVU_k = \frac{\sum_{t=1}^{z}(y_{k,t} - \hat{y}_{k,t})^2}{\sum_{t=1}^{z}(y_{k,t} - \overline{y}_{k,z})^2}, \quad \text{(formula 7)}$$

where $y_{k,t}$ is real data t of the target channel k of the to-be-authenticated radar, $\hat{y}_{k,t}$ is predicted data t of the target channel k of the to-be-authenticated radar, $1 \leq t \leq z$, t is a positive integer, and $\overline{y}_{k,z}$ is an average value of z pieces of real data of the target channel k of the to-be-authenticated radar.

In this embodiment of this application, the computer device may verify, based on the predicted data of the target channel of the to-be-authenticated radar and the real data of the target channel of the to-be-authenticated radar, whether the to-be-authenticated radar and the target radar are the same radar. When the predicted data of the target channel of the to-be-authenticated radar and the real data of the target channel of the to-be-authenticated radar meet a determining condition, the computer device determines that the to-be-authenticated radar and the target radar are not the same radar. The determining condition includes one or more of the following. The cosine similarity $C_k$ between the predicted data of the target channel of the to-be-authenticated radar and the real data of the target channel of the to-be-authenticated radar is less than the first threshold, the $MSE_k$ between the predicted data of the target channel of the to-be-authenticated radar and the real data of the target channel of the to-be-authenticated radar is greater than the second threshold, and the $FVU_k$ that is obtained through calculation based on the predicted data of the target channel of the to-be-authenticated radar and the real data of the target channel of the to-be-authenticated radar is greater than the third threshold. The determining condition may further include other conditions, and such conditions are not illustrated in this embodiment of this application. The first threshold may be 0.5, the second threshold may be 100, and the third threshold may be 20.

Optionally, when the prediction model includes only a sub-model corresponding to one target channel, that is, when a fingerprint of the target radar includes only a fingerprint of one target channel, if the predicted data of the target channel of the to-be-authenticated radar and the real data of the target channel of the to-be-authenticated radar meet the determining condition, the computer device determines that the to-be-authenticated radar and the target radar are not the same radar, or if the predicted data of the target channel of the to-be-authenticated radar and the real data of the target channel of the to-be-authenticated radar do not meet the determining condition, the computer device determines that the to-be-authenticated radar and the target radar are the same radar.

Optionally, when the prediction model includes a plurality of sub-models corresponding to a plurality of target channels, that is, when a fingerprint of the target radar includes fingerprints of a plurality of target channels, the computer device may verify, based on predicted data of the plurality of target channels of the to-be-authenticated radar and real data of the plurality of target channels of the to-be-authenticated radar, whether the to-be-authenticated radar and the target radar are the same radar. If predicted data of any target channel of the to-be-authenticated radar and real data of the target channel of the to-be-authenticated radar meet the determining condition, the computer device determines that the to-be-authenticated radar and the target radar are not the same radar, or if predicted data of no target channel of the to-be-authenticated radar and real data of no target channel of the to-be-authenticated radar meet the determining condition, the computer device determines that the to-be-authenticated radar and the target radar are the same radar.

For example, the determining condition is that the $FVU_k$ that is obtained through calculation based on the predicted data of the target channel of the to-be-authenticated radar and the real data of the target channel of the to-be-authenticated radar is greater than the third threshold, and the prediction model includes 16 sub-models corresponding to 16 channels. The computer device invokes the 16 sub-models separately to obtain predicted data of the 16 channels of the to-be-authenticated radar, and then obtains, based on predicted data of each channel and real data of the channel, an FVU corresponding to the channel. If a maximum value in the fractions of variance unexplained corresponding to the 16 channels is greater than the third threshold, the computer device determines that the to-be-authenticated radar and the target radar are not the same radar, or if a maximum value in the fractions of variance unexplained corresponding to the 16 channels is less than or equal to the third threshold, the computer device determines that the to-be-authenticated radar and the target radar are the same radar.

A sequence of steps in the radar authentication method provided in the embodiments of this application may be properly adjusted, or steps may be correspondingly added or deleted based on a situation. Any variation readily figured out by a person skilled in the art within the technical scope disclosed in this application shall fall within the protection scope of this application, and therefore, details are not described herein.

In summary, in the radar authentication method provided in this embodiment of this application, after obtaining the output data of the to-be-authenticated radar, the computer device first invokes the prediction model obtained through training based on the real data of the plurality of channels of the target radar, to obtain the predicted data of the to-be-authenticated radar based on the output data of the to-be-authenticated radar, and then authenticates the to-be-authenticated radar based on the predicted data of the to-be-authenticated radar and the real data of the to-be-authenticated radar. Therefore, there is no need to preset a key in the radar, and an identity of the to-be-authenticated radar can be authenticated only based on the output data of the to-be-authenticated radar and the prediction model that is obtained through training based on the output data of the target radar. Therefore, a security problem in radar authentication is fundamentally resolved, and reliability of radar authentication is relatively high. In addition, in the radar authentication method provided in this embodiment of this application, there is no need to make a hardware improvement on the radar. Therefore, the method has relatively high compatibility and a relatively wide application scope.

Figure 3:
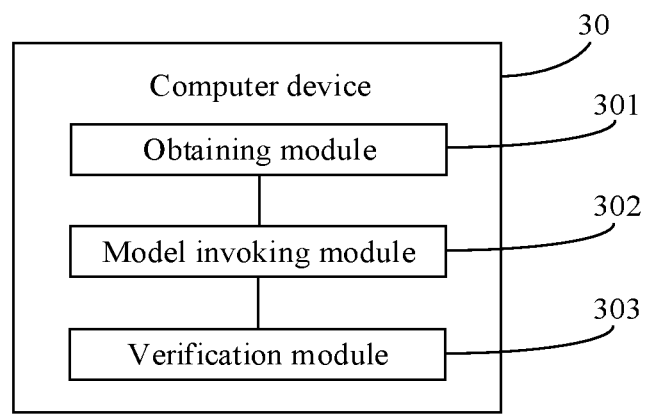
FIG. 3 is a schematic diagram of a structure of a computer device according to an embodiment of this application.

FIG. 3 is a schematic diagram of a structure of a computer device according to an embodiment of this application. As shown in FIG. 3, the computer device 30 includes an obtaining module 301 configured to obtain output data of a to-be-authenticated radar, where the output data of the to-be-authenticated radar is obtained based on an emitted wave of the to-be-authenticated radar and a reflected wave received by the to-be-authenticated radar, a model invoking module 302 configured to invoke a prediction model to obtain predicted data of the to-be-authenticated radar based on the output data of the to-be-authenticated radar, where the prediction model is obtained through training based on output data of a target radar, and the output data of the target radar is obtained based on an emitted wave of the target radar and a reflected wave received by the target radar, and a verification module 303 configured to verify, based on the predicted data of the to-be-authenticated radar and the output data of the to-be-authenticated radar, whether the to-be-authenticated radar and the target radar are the same radar.

Optionally, the prediction model is obtained by the computer device through training, or the prediction model comes from a device other than the computer device.

Optionally, the output data of the target radar includes real data of a plurality of channels of the target radar, the prediction model includes at least one sub-model, and each sub-model corresponds to one of the plurality of channels, and a target sub-model corresponding to a target channel in the plurality of channels is obtained through training based on real data of other channels of the target radar and real data of the target channel of the target radar, and the other channels include at least one of the plurality of channels other than the target channel.

Optionally, the target sub-model is obtained through training based on the real data of the other channels of the target radar and the real data of the target channel of the target radar by using a linear regression algorithm.

Optionally, the target sub-model is obtained through training by using a linear regression model, and the linear regression model is expressed as follows:

$$y_{k,i} = \sum_{1 \leq j \leq n} c_{k,j} x_{i,j} + b_k,$$

where k represents the target channel, $y_{k,i}$ represents real data i of the target channel k of the target radar, n represents a quantity of the other channels, j represents a channel j among the other channels, $c_{k,j}$ represents a coefficient j of the target sub-model, $x_{i,j}$ represents real data i of the channel j of the target radar, $b_k$ represents an increment of the target sub-model, and k, i, j, and n are all positive integers.

Optionally, the output data of the to-be-authenticated radar includes real data of a plurality of channels of the to-be-authenticated radar, and the model invoking module 302 is configured to invoke the target sub-model to obtain predicted data of a target channel of the to-be-authenticated radar based on real data of other channels of the to-be-authenticated radar, and correspondingly, the verification module 303 is configured to verify, based on the predicted data of the target channel of the to-be-authenticated radar and real data of the target channel of the to-be-authenticated radar, whether the to-be-authenticated radar and the target radar are the same radar.

Optionally, the verification module 303 is configured to, when a cosine similarity between the predicted data of the target channel of the to-be-authenticated radar and the real data of the target channel of the to-be-authenticated radar is less than a first threshold, and an MSE between the predicted data of the target channel of the to-be-authenticated radar and the real data of the target channel of the to-be-authenticated radar is greater than a second threshold, and/or an FVU that is obtained through calculation based on the predicted data of the target channel of the to-be-authenticated radar and the real data of the target channel of the to-be-authenticated radar is greater than a third threshold, determine that the to-be-authenticated radar and the target radar are not the same radar.

Optionally, the verification module 303 is configured to verify, based on predicted data of a plurality of target channels of the to-be-authenticated radar and real data of the plurality of target channels of the to-be-authenticated radar, whether the to-be-authenticated radar and the target radar are the same radar.

Optionally, the target radar is a millimeter wave radar, and the output data of the target radar includes a Doppler frequency.

In summary, in the computer device provided in this embodiment of this application, the obtaining module obtains the output data of the to-be-authenticated radar, the model invoking module invokes the prediction model that is obtained through training based on the real data of the plurality of channels of the target radar, to obtain the predicted data of the to-be-authenticated radar based on the output data of the to-be-authenticated radar, and the verification module authenticates the to-be-authenticated radar based on the predicted data of the to-be-authenticated radar and the output data of the to-be-authenticated radar. Therefore, there is no need to preset a key in the radar, and an identity of the to-be-authenticated radar can be authenticated only based on the output data of the to-be-authenticated radar and the prediction model that is obtained through training based on the output data of the target radar. Therefore, a security problem in radar authentication is fundamentally resolved, and reliability of radar authentication is relatively high.

For the computer device in the foregoing embodiment, a manner of performing an operation by each module is described in the embodiments related to the method, and details are not described herein again.

An embodiment of this application further provides a computer device, including a processor and a memory.

The memory is configured to store a computer program, where the computer program includes program instructions.

The processor is configured to invoke the computer program to implement the model training method and/or the radar authentication method in the foregoing method embodiment.

Figure 4:
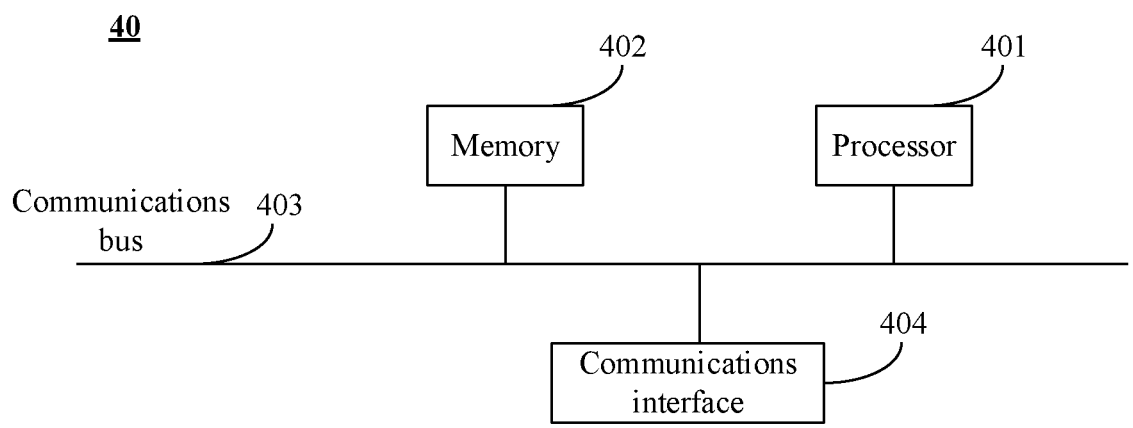
FIG. 4 is a diagram of a computer device according to an embodiment of this application.

For example, FIG. 4 is a block diagram of a computer device according to an embodiment of this application. The computer device may be an in-vehicle terminal or other terminal devices for authenticating an identity of a radar. As shown in FIG. 4, the computer device 40 includes a processor 401 and a memory 402.

The memory 402 is configured to store computer programs, and the computer programs include program instructions.

The processor 401 is configured to invoke the computer programs to implement an action performed by the computer device in the foregoing method embodiment.

Optionally, the computer device 40 further includes a communications bus 403 and a communications interface 404.

The processor 401 includes one or more processing cores, and the processor 401 executes various function applications and data processing by running the computer program.

The memory 402 may be configured to store the computer program. Optionally, the memory may store an operating system and an application program unit required by at least one function. The operating system may be an operating system such as a real-time operating system (Real Time eXecutive (RTX)), LINUX, UNIX, WINDOWS, or OS X.

There may be a plurality of communications interfaces 404, and the communications interface 404 is configured to communicate with another device. For example, in this embodiment of this application, the communications interface of the computer device may be configured to receive output data from a radar.

The memory 402 and the communications interface 404 are respectively connected to the processor 401 by using the communications bus 403.

An embodiment of this application further provides a radar authentication system. The radar authentication system includes a computer device and a radar. The radar periodically sends output data of the radar to the computer device, and the computer device authenticates an identity of the radar periodically based on the output data of the radar.

Optionally, the radar authentication system may be applied to the vehicle field. In this case, the computer device may be an in-vehicle terminal. The radar authentication system may be further applied to other fields related to radar recognition. This is not limited in this embodiment of this application.

An embodiment of this application further provides a computer storage medium. The computer storage medium stores instructions, and when the instructions are executed by a processor of a computer device, actions performed by the computer device in the foregoing method embodiment are implemented.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, an optical disc, or the like.

In the embodiments of this application, the terms "first", "second", and "third" are merely used for a purpose of description, and shall not be understood as an indication or implication of relative importance.

The term "and/or" in this application describes only an association relationship for describing associated objects and indicates that three relationships may exist. For example, A and/or B may indicate the following three cases: only A exists, both A and B exist, and only B exists. In addition, the character "I" in this specification generally indicates an "or" relationship between the associated objects.

The foregoing descriptions are merely example embodiments of this application, but are not intended to limit this application. Any modification, equivalent replacement, or improvement made without departing from the principle of this application shall fall within the protection scope of this application.

What is claimed is:

1. A radar authentication method, comprising:
   obtaining first output data of a to-be-authenticated radar, wherein the first output data is based on a first emitted wave of the to-be-authenticated radar and a first reflected wave received at the to-be-authenticated radar;
   obtaining a prediction model through training based on second output data of a target radar, wherein the second output data comprises real data of a plurality of channels of the target radar, wherein the prediction model comprises at least one sub-model, wherein each sub-model corresponds to one of the plurality of channels;
   invoking the prediction model to obtain predicted data of the to-be-authenticated radar based on the first output data, wherein invoking the prediction model comprises invoking a target sub-model corresponding to a target channel in the plurality of channels to obtain predicted data of a target channel of the to-be-authenticated radar based on real data of other channels of the to-be-authenticated radar; and
   verifying, based on the predicted data of the target channel of the to-be-authenticated radar and real data of the target channel of the to-be-authenticated radar, whether the to-be-authenticated radar and the target radar are the same radar, wherein the to-be-authenticated radar and the target radar are not the same radar when at least one of the following is obtained:
   a cosine similarity between the predicted data of the target channel of the to-be-authenticated radar and the real data of the target channel of the to-be-authenticated radar is less than a first threshold, and a mean square error between the predicted data of the target channel of the to-be-authenticated radar and the real data of the target channel of the to-be-authenticated radar is greater than a second threshold; or
   a fraction of variance unexplained that is obtained through calculation based on the predicted data of the target channel of the to-be-authenticated radar and the real data of the target channel of the to-be-authenticated radar is greater than a third threshold.

2. The radar authentication method of claim 1, further comprising:
   obtaining the prediction model through training; or
   obtaining the prediction model from another device.

3. The radar authentication method of claim 2, further comprising obtaining the target sub-model corresponding to the target channel in the plurality of channels through training based on real data of other channels of the target radar and real data of the target channel of the target radar, and wherein the other channels comprise at least one of the plurality of channels other than the target channel.

4. The radar authentication method of claim 3, further comprising obtaining the target sub-model through training based on the real data of the other channels of the target radar and the real data of the target channel of the target radar using a linear regression algorithm.

5. The radar authentication method of claim 4, further comprising obtaining the target sub-model through training using a linear regression model, wherein the linear regression model is expressed as follows:

$$y_{k,i} = \sum_{1 \leq j \leq n} c_{k,j} x_{i,j} + b_k,$$

wherein k represents the target channel, wherein $y_{k,i}$ represents real data i of the target channel k of the target radar, wherein n represents a quantity of the other channels, wherein j represents a channel j among the other channels, wherein $c_{k,j}$ represents a coefficient j of the target sub-model, wherein $x_{i,j}$ represents real data i of the channel j of the target radar, wherein $b_k$ represents an increment of the target sub-model, and wherein k, i, j, and n are all positive integers.

6. The radar authentication method of claim 1, wherein verifying whether the to-be-authenticated radar and the target radar are the same radar comprises further verifying, based on predicted data of a plurality of target channels of the to-be-authenticated radar and real data of the plurality of target channels of the to-be-authenticated radar, whether the to-be-authenticated radar and the target radar are the same radar.

7. The radar authentication method of claim 1, wherein the target radar is a millimeter wave radar, and wherein the second output data comprises a Doppler frequency.

8. A computer device comprising:
   one or more processors; and
   a memory coupled to the one or more processors and configured to store program instructions and that when invoked by the one or more processors cause the computer device to:
   obtain first output data of a to-be-authenticated radar, wherein the first output data is based on a first emitted wave of the to-be-authenticated radar and a first reflected wave received at the to-be-authenticated radar;
   obtain a prediction model through training based on second output data of a target radar, wherein the second output data comprises real data of a plurality of channels of the target radar, wherein the prediction model comprises at least one sub-model, wherein each sub-model corresponds to one of the plurality of channels;
   invoke the prediction model to obtain predicted data of the to-be-authenticated radar based on the first output data, wherein invoking the prediction model comprises invoking a target sub-model corresponding to a target channel in the plurality of channels to obtain predicted data of a target channel of the to-beauthenticated radar based on real data of other channels of the to-be-authenticated radar; and verify, based on the predicted data of the target channel of the to-be-authenticated radar and real data of the target channel of the to-be-authenticated radar, whether the to-be-authenticated radar and the target radar are the same radar, wherein the to-be-authenticated radar and the target radar are not the same radar when at least one of the following is obtained:

a cosine similarity between the predicted data of the target channel of the to-be-authenticated radar and the real data of the target channel of the to-be-authenticated radar is less than a first threshold, and a mean square error between the predicted data of the target channel of the to-be-authenticated radar and the real data of the target channel of the to-be-authenticated radar is greater than a second threshold; or a fraction of variance unexplained that is obtained through calculation based on the predicted data of the target channel of the to-be-authenticated radar and the real data of the target channel of the to-be-authenticated radar is greater than a third threshold.

9. The computer device of claim 8, wherein the program instructions that when invoked by the one or more processors further cause the computer device to:

obtain the prediction model by the computer device through training; or obtain the prediction model from a device other than the computer device.

10. The computer device of claim 9, wherein the program instructions that when invoked by the one or more processors further cause the computer device to obtain the target sub-model corresponding to the target channel in the plurality of channels through training based on real data of other channels of the target radar and real data of the target channel of the target radar, and wherein the other channels of the target radar comprise at least one of the plurality of channels other than the target channel.

11. The computer device of claim 10, wherein the program instructions that when invoked by the one or more processors further cause the computer device to obtain the target sub-model through training based on the real data of the other channels of the target radar and the real data of the target channel of the target radar using a linear regression algorithm.

12. The computer device of claim 11, wherein the program instructions that when invoked by the processor further cause the computer device to obtain the target sub-model through training using a linear regression model, wherein the linear regression model is expressed as follows:

$$y_{k,i} = \sum_{1 \le j \le n} c_{k,j} x_{i,j} + b_k,$$

wherein k represents the target channel, wherein $y_{k,i}$ represents real data i of the target channel k of the target radar, wherein n represents a quantity of the other channels of the target radar, wherein j represents a channel j among the other channels of the target radar, wherein $c_{k,j}$ represents a coefficient j of the target sub-model, wherein $x_{i,j}$ represents real data i of the channel j of the target radar, wherein $b_k$ represents an increment of the target sub-model, and wherein k, i, j, and n are all positive integers.

13. The computer device of claim 8, wherein the program instructions that when invoked by the one or more processors further cause the computer device to verify, based on predicted data of a plurality of target channels of the to-be-authenticated radar and real data of the plurality of target channels of the to-be-authenticated radar, whether the to-be-authenticated radar and the target radar are the same radar.

14. The computer device of claim 8, wherein the target radar is a millimeter wave radar, and the second output data comprises a Doppler frequency.

15. A computer program product comprising computer-executable instructions that are stored on a non-transitory computer-readable medium and that, when executed by one or more processors, causes a computer device to:

obtain first output data of a to-be-authenticated radar, wherein the first output data is based on a first emitted wave of the to-be-authenticated radar and a first reflected wave received at the to-be-authenticated radar;

obtain a prediction model through training based on second output data of a target radar, wherein the second output data of the target radar comprises real data of a plurality of channels of the target radar, wherein the prediction model comprises at least one sub-model, wherein each sub-model corresponds to one of the plurality of channels;

obtain a target sub-model corresponding to a target channel in the plurality of channels through training using a linear regression model, wherein the linear regression model is expressed as follows:

$$y_{k,i} = \sum_{1 \le j \le n} c_{k,j} x_{i,j} + b_k,$$

wherein k represents the target channel, wherein $y_{k,i}$ represents real data i of the target channel k of the target radar, wherein n represents a quantity of other channels of the target radar, wherein j represents a channel j among the other channels of the target radar, wherein $c_{k,j}$ represents a coefficient j of the target sub-model, wherein $x_{i,j}$ represents real data i of the channel i of the target radar, wherein $b_k$ represents an increment of the target sub-model, and wherein k, i, j, and n are all positive integers, invoke the target sub-model corresponding to the target channel in the plurality of channels to obtain predicted data of a target channel of the to-be-authenticated radar based on real data of other channels of the to-be-authenticated radar; and verify, based on the predicted data of the target channel of the to-be-authenticated radar and real data of the target channel of the to-be-authenticated radar, whether the to-be-authenticated radar and the target radar are the same radar.

16. The computer program product of claim 15, wherein the computer-executable instructions that when executed by the one or more processors further causes the computer device to further obtain, from a device other than the computer device, the prediction model.

17. The computer program product of claim 15, wherein the computer-executable instructions that when executed by the one or more processors further causes the computer device to obtain the target sub-model corresponding to the target channel in the plurality of channels through training based on real data of the other channels of the target radar and real data of the target channel of the target radar, and wherein the other channels of the target radar comprise at least one of the plurality of channels other than the target channel.

18. The computer program product of claim 15, wherein the computer-executable instructions that when executed by the one or more processors further causes the computer device to obtain the target sub-model through training based on the real data of the other channels of the target radar and the real data of the target channel of the target radar using a linear regression algorithm.

19. The computer program product of claim 15, wherein the computer-executable instructions that when executed by the one or more processors further causes the computer device to verify, based on predicted data of a plurality of target channels of the to-be-authenticated radar and real data of the plurality of target channels of the to-be-authenticated radar, whether the to-be-authenticated radar and the target radar are the same radar.

20. The computer program product of claim 15, wherein the target radar is a millimeter wave radar, and the second output data comprises a Doppler frequency.

\* \* \* \* \*